United States Patent [19]

Recasens et al.

[11] 3,837,870

[45] Sept. 24, 1974

[54] FUSED CAST REFRACTORY PRODUCTS CONTAINING CHROMIC OXIDE

[75] Inventors: Joseph Recasens, Sorgues; Maurice Gardiol, Avignon, both of France

[73] Assignee: L'Electro-Refractaire, Paris, France

[22] Filed: May 11, 1973

[21] Appl. No.: 359,596

[30] Foreign Application Priority Data

May 12, 1972 France .............................. 72.17015

[52] U.S. Cl........................ 106/57, 106/65, 106/66
[51] Int. Cl.. C04b 35/10, C04b 35/12, C04b 35/48
[58] Field of Search........................... 106/57, 66, 65

[56] References Cited
UNITED STATES PATENTS
2,271,368  1/1942  Fulcher............................... 106/57
2,297,546  9/1942  Field................................... 106/57
2,919,994  1/1960  Steimke............................... 106/57

*Primary Examiner*—J. Poer

[57] ABSTRACT

The invention relates to the refractory art and, more specifically, to fused cast refractory compose of crystalline phases based on chromic oxide, zirconia and, possibly, alumina, and of a vitreous phase comprising silica, a substantially saturating amount of alumina and at least one oxide of the group consisting of $Na_2O$, $K_2O$, $Li_2O$, $CaO$, $BaO$, $BeO$ and $MgO$, the composition of the product, expressed by weight in terms of the oxides, being as follows: 1–74% $Cr_2O_3$, 15–40% $ZrO_2$, 3–76% $Al_2O_3$, 7.5–20% $SiO_2$ and a minor amount of at least one oxide of the group consisting of $Na_2O$, $K_2O$, $Li_2O$, $CaO$, $BaO$, $BeO$ and $MgO$.

The products of the invention are useful for the construction of glass furnaces.

10 Claims, No Drawings

FUSED CAST REFRACTORY PRODUCTS CONTAINING CHROMIC OXIDE

The invention relates to novel fused cast refractory products comprising crystalline phases based on chromic oxide, zirconia and possibly alumina, and a vitreous phase which comprises silica, one or more oxides of the group of alkaline oxides and alkaline earth oxides, and alumina and forms a matrix for the crystalline phases. The refractory products are useful for the construction of glass melting furnaces.

U.S. Pat. No. 2,271,368 discloses fused cast refractory products comprising zirconia, chromic oxide and limited amounts of alumina and silica. According to this U.S. Patent, the silica, which forms alone or with a portion of the alumina present an intermediate vitreous matrix between the crystalline phases formed by the other constituents must be present in amounts less than 5 percent by weight. These prior art refractory products have very satisfactory resistance to corrosion by glass, but they have lacked commercial success due to the difficulties encountered in making them. It is very difficult to produce in acceptable yield (i.e., with a low level of defectuous products and therefore at an acceptable cost price refractory products of a size large enough for the construction of furnaces, such products fracturing during manufacture and use and being excessively porous.

Surprisingly, the Applicants have found that fused cast products formed by crystalline phases based on chromic oxide, zirconia and, possibly, alumina, and by a vitreous silicate phase, can be readily produced in satisfactory yields, the products having a resistance to corrosion by molten glass which is considerably superior than that of products based on zirconia, alumina and silica currently used in the construction of glass melting furnaces, if the proportion of vitreous phase is increased above that used according to the aforementioned United States patent and if the vitreous phase is modified by the presence of suitable additional oxides.

The invention provides a fused cast refractory product composed of crystalline phases based on chromic oxide and zirconia or on those oxides and alumina, and of a vitreous phase comprising silica, a substantially saturating amount of alumina, and at least one oxide of the group of $Na_2O$, $K_2O$, $Li_2O$, CaO, BaO, BeO and MgO, the composition of the product, expressed by weight in terms of the oxides, being as follows : 1–74% $Cr_2O_3$, 15–40% $ZrO_2$, 3–76% $Al_2O_3$, 7.5–20% $SiO_2$, and a minor amount of at least one oxide of the group of $Na_2O$, $K_2O$, $Li_2O$, CaO, BaO, BeO and MgO.

Generally and preferably, the product of the invention will comprise $Na_2O$ as the sole or chief constituent of the defined group of alkaline and alkaline earth metal oxides, because this oxide is usually present in the raw materials used for making the products of the invention. When $Na_2O$ is the sole constituent of the defined group, it should be present in an amount ranging from 0.4 to 2.5 percent by weight, the ratio of silica to $Na_2O$ being between about 8:1 and 18:1. However, as this is well known to the specialists in the refractory art, and recognized in many places in the literature dealing with refractory products containing a vitreous silica based phase, the $Na_2O$ can be totally or partly replaced by one or several of other alkaline and alkaline earth metal oxides, such as $K_2O$, $Li_2O$, CaO, BaO, BeO and MgO, because these other oxides have properties similar to those of $Na_2O$. Of course, these other oxides should be used in technically equivalent amounts which may differ from those indicated for $Na_2O$, particularly if alkaline earth oxides are used. It is not possible to define limits for the amounts of said other oxides of the defined group because the systems formed by silica, alumina, and alkaline and alkaline earth metal oxides are very complex, specially when several alkaline and/or alkaline earth metal oxides are simultaneously present, as this is well known in the art. However, it is deemed that the determination of amounts of $K_2O$, $Li_2O$, CaO, BaO, BeO and MgO technically equivalent to the indicated amounts of $Na_2O$ is quite at the hand of the specialists.

Consequently, in the following further description of the invention reference will mainly be made to the use of $Na_2O$ in order to avoid repeated references to the alternative oxides but the possibility of using those alternatives should be kept in view as being within the scope of the invention.

The crystalline phases of the products according to the invention contain a zirconia phase and a chromic oxide phase or a solid solution phase of chromic oxide and alumina when the latter is present in an amount exceeding the amount required for the saturation of the vitreous phase.

The large amount (of the order of 10–25 percent) and the nature of the vitreous phase of the products according to the invention greatly facilitate the manufacture of such products. The vitreous phase, which is formed by silica, $Na_2O$ and at least a proportion of the alumina present in the whole composition, is plastic above about 1,400°C, so that molded pieces can be obtained in satisfactory yields. Moreover the saturation of the vitreous phase with alumina increases its viscosity (therefore reducing its tendency to exude) and makes it less liable to be penetrated by molten glass.

Apart from the fact that it facilitates the manufacture of the products, the high content of the vitreous phase gives the products one property in particular which distinguishes them from the prior art refractory products containing $Cr_2O_3$. It is well known, for instance from U.S. Pat. No. 3,279,776, that the vapour tension of $Cr_2O_3$ is very high at elevated temperature and in an oxidising atmosphere. The result is that the $Cr_2O_3$ refractory products according to the prior art become heavily worn when used for parts of the furnace which are not below the level of the molten glass, so that they have no value as a superstructure material. In contrast, no appreciable volatilization is observed in the products according to the invention. This is very surprising in view of the presence of $Na_2O$ (or equivalent), which has hitherto been thought to have the tendency to speed up or promote such volatilization. One possible explanation of this remarkable fact might be the existence of a protective coating of the $Cr_2O_3$ crystals by the vitreous matrix when the latter is present in a large amount as in the invention and homogeneously distributed.

To obtain a suitable vitreous phase, 7.5–20% silica must be present in the composition. Below 7.5% the proportion of the vitreous phase is inadequate and the refractory products are liable to fracture. Above 20% the vitreous phase is excessive and the resistance to corrosion by molten glass of the refractory products is considerably reduced. It has been found that the range of 10–16% $SiO_2$ was preferable as regards cost of raw material, manufacturing yeild and resistance to corrosion. Similarly, to obtain a vitreous phase of satisfactory quality, the $Na_2O$ must be present in an amount such that the ratio of silica to $Na_2O$ is from about 8:1 to 18:1, corresponding to amounts of $Na_2O$ of approximately 0.4–2.5%. With ratios lower than 8:1 or higher than 18:1 the products show cracks. Preferably the silica to $Na_2O$ ratio is in the range 11:1 to 14:1.

The vitreous phase must also be substantially saturated with alumina. The minimum amount of alumina required for this purpose of course varies with the amounts of silica and alkaline and/or alkaline earth oxides present in the composition. However, it has been found that 3 percent alumina was in practice a satisfactory minimum for ensuring saturation of the vitreous phase with alumina at temperatures of up to 1,600°C, and this is adequate in practice.

As regards the other oxides forming the composition, zirconia must be present in an amount of 15–40 percent. In this range zirconia gives the products a certain plasticity due to the crystalline transformation of the zirconia, which is favourable to the obtaining of satisfactory yields and to a satisfactory resistance in use. Below 15 percent zirconia the products crack due to their lack of plasticity. The products also have a strong tendency to fracture due to the excessive increase in volume accompanying the crystalline transformation of zirconia when this oxide is present in quantities above 40 percent by weight.

Chromic oxide can be present in amounts of 1–74 percent. Even 1% $Cr_2O_3$ produces a considerable improvement (of the order of 10 percent) over products of similar composition free from $Cr_2O_3$. However, there is preferably at least 5 percent $Cr_2O_3$ in the products according to the invention. As already shown, at least 3% alumina must be present and up to 76 percent can be used. Preferably, however, the amount of alumina does not exceed 50 percent, since products with a higher $Al_2O_3$ content have a resistance to corrosion which is considerably diminished in proportion as the $Al_2O_3$ content rises, at least at elevated temperature (above 1,500°C). These products with high $Al_2O_3$ content may however be advantageous for making parts of a furnace subjected to lower temperatures (of the order of 1,250°C), since they can more readily be manufactured than the conventional aluminous products (use of sand moulds instead of graphite moulds) and are more resistant to corrosion at such relatively low temperatures than the conventional products based on alumina, zirconia and silica.

The products according to the invention can also be arranged in two main categories, those containing not more than 30% $Cr_2O_3$ and those containing more than 30% $Cr_2O_3$. The former can be considered economic products which nevertheless have a considerably better resistance to corrosion by molten glass than the $SiO_2$—$ZrO_2$—$Al_2O_3$ refractory products currently used hitherto for the construction of glass melting furnaces. The improvement in resistance is substantially proportional to the $Cr_2O_3$ content in the range of 1–30% $Cr_2O_3$. On the other hand, the latter can be considered to be high grade products which are more expensive than the preceding ones (chromic oxide is an expensive product) but have a better resistance to corrosion by molten glass.

In dependence on the intended use, a particular refractory product will be selected on the basis of the best compromise between the best cost prce and corrosion resistance.

In the manufacture of the refractory products according to the invention, the starting materials are melted, for instance, in an electric furnace. The melting must be performed in conditions preventing the reduction of the chromic oxide, which is easily reducible. Such a reduction would lead to a considerable metallic suspension causing a loss of $Cr_2O_3$ and also possibly causing trouble during use (bubble formation). To avoid such reduction, melting can be performed in oxidising conditions using one of the well known methods, for instance, melting with a so-called long arc with blowing of an oxidising gas into the bath.

The products containing up to 30% $Cr_2O_3$ can be cast in conventional sand moulds, thus contributing towards obtaining an economic cost price. The products containing more than 30% $Cr_2O_3$ must be cast in more refractory moulds, for instance, graphite moulds.

The cast products are cooled in a controlled manner by techniques currently used in the manufacture of fused cast refractory products. Generally, cooling in an insulating powder will be used. For instance, for products containing less than 30% $Cr_2O_3$, kieselguhr or diatomite are very suitable as the insulating powder. For products containing more than 30% $Cr_2O_3$ use must be made of a more refractory insulating powder, for instance alumina, to prevent it from melting and sticking to the moulded piece.

The starting materials for making the products according to the invention can be the oxides entering into the composition or sources producing such oxides. For instance, it is very advantageous from the economic aspect to use zircon ($ZrSiO_4$) as the source of $ZrO_2$ and $SiO_2$. The products according to the invention prepared from zircon will have a ratio by weight of $ZrO_2$ to $SiO_2 \sim 2$ and constitute the economically preferred products. The amount of zircon to be used is 22, 5–60 percent, preferably 33–45 percent, of the whole composition. To obtain products having a $ZrO_2$ to $SiO_2$ ratio smaller than about 2 it is enough, for instance, to enrich the starting composition (2:1 ratio) with $SiO_2$, for instance by adding sand. On the other hand, products having a $ZrO_2$ to $SiO_2$ ratio greater than 2 are economically less advantageous because in order to obtain them, concentrates of zirconia or pure zirconia must be added to the zircon, and this is less advantageous than the addition of extra $Cr_2O_3$.

The fused cast refractory products in which zircon is used as a source of zirconia and silica must not be confused with agglomerated products such as those disclosed in Canadian patent No. 686,332. In these agglomerated products prepared by casting a slip composition into plaster moulds, followed by firing at elevated temperature, the crystalline phase of the zircon remains in the final product, whereas in the products according to the invention there are no crystals of zircon, since it dissociates into zirconia which forms a separate crystalline phase, and silica which forms the vitreous phase.

The products according to the invention are free from any significant amounts of compounds other than those mentioned. They may however contain small amounts (less than 0.2 percent) of $Fe_2O_3$ and $TiO_2$ present in some starting materials used.

The following non-limitative examples are given to illustrate the invention:

EXAMPLE 1

This Example illustrates a fused cast refractory product which is one of the compositions according to the invention which are most economical in raw materials and facility of manufacture. Its composition, by weight on the basis of the oxides, is 30% $ZrO_2$, 28.8% $Al_2O_3$, 25% $Cr_2O_3$, 15% $SiO_2$ and 1.2% $Na_2O$. The product is made using melting, casting, moulding and controlled cooling conditions similar to those used in the case of a conventional composition containing 32% $ZrO_2$, 50.8% $Al_2O_3$, 16% $SiO_2$ and 1.2% $Na_2O$. The product obtained is 3.5 times more resistant to sodalime glass melted at 1,580°C than the aforementioned conventional product.

EXAMPLE 2

This Example illustrates a fused cast refractory product according to the invention which is a high grade, relatively expensive material in the class of the best commercially available sintered pure chromic oxides. Its composition, by weight on the basis of the oxides, is as follows: 15% $ZrO_2$, 3% $Al_2O_3$ (mainly found in the vitreous matrix), 74% $Cr_2O_3$, 7.5% $SiO_2$ and 0.5% $Na_2O$. The composition can be melted in an electric furnace and cast at about 2,200°C into graphite moulds. Its use is justified only for applications in which exceptional resistance to corrosion is required (melting of E-type glass, for instance).

EXAMPLES 3–16

The following Table gives the compositions and resistances to corrosion by sodalime glass at 1,580°C of a number of refractory products according to the invention. The Table also shows by way of comparison the resistance to corrosion of a conventional composition (Example 3) of the type $SiO_2$—$ZrO_2$—$Al_2O_3$ and those of compositions (Examples 15 and 16) containing chromic oxide, but falling outside the scope of the invention. These latter compositions, although they have advantageous resistance to corrosion, cannot produce satisfactory pieces, since they crack upon cooling.

In Examples 3–16 blocks measuring 200 × 200 × 350 mm are cast by conventional techniques from the molten material of the composition indicated.

We claim:

1. A fused cast refractory product composed of crystalline phases based on chrome oxide, zirconia and, possibly, alumina, and of a vitreous phase comprising silica, a substantially saturating amount of alumina and at least one oxide of the group consisting of $Na_2O$, $K_2O$, $Li_2O$, CaO, BaO, BeO and MgO, the composition of the product, expressed by weight in terms of the oxides, being as follows: 1–74% $Cr_2O_3$, 15–40% $ZrO_2$, 3–76% $Al_2O_3$, 7.5–20% $SiO_2$ and a minor amount of at least one oxide of the group consisting of $Na_2O$, $K_2O$, $Li_2O$, CaO, BaO, BeO and MgO said refractory product being substantially free from other oxides.

2. A refractory product according to claim 1, which contains from 0.4 to 2.5% by weight of $Na_2O$, the ratio of silica to $Na_2O$ being from 8:1 to 18:1 inclusively.

3. A refractory product according to claim 1, which contains 10–16% $SiO_2$.

4. A refractory product according to claim 2, wherein the ratio by weight of silica to $Na_2O$ is in the range from 11:1 to 14:1.

5. A refractory product according to claim 1, which contains at least 5 percent by weight $Cr_2O_3$.

6. A refractory product according to claim 1, which contains not more than 50 percent by weight $Al_2O_3$.

7. A refractory product according to claim 1, which contains not more than 30 percent by weight $Cr_2O_3$.

8. A refractory product according to claim 1, which contains more than 30 percent by weight $Cr_2O_3$.

9. A refractory product according to claim 1, wherein the ratio by weight of $ZrO_2$ to $SiO_2$ is equal to or less than 2:1.

10. A refractory product according to claim 2, which contains by weight 5–74% $Cr_2O_3$, 15–40% $ZrO_2$, 3–50% $Al_2O_3$, 10–16% $SiO_2$ and an amount of $Na_2O$ such that the ratio by weight of $SiO_2$ to $Na_2O$ is in the range 11:1 to 14:1, the ratio by weight of $ZrO_2$ to $SiO_2$ being equal to or less than 2:1.

| Examples | | $SiO_2$ | $ZrO_2$ | $Al_2O_3$ | $Cr_2O_3$ | $Na_2O$ | Index of resistance* to corrosion by soda-lime glass at 1580°C | Remarks |
|---|---|---|---|---|---|---|---|---|
| 3 | (control) | 16 | 33 | 49.8 | — | 1.2 | 100 | Not cracked |
| 4 | | 16 | 32 | 49.1 | 1 | 1.2 | 110 | do. |
| 5 | | 7.5 | 15 | 76 | 1 | 0.5 | 80–90 ** | do. |
| 6 | | 15 | 30 | 48.1 | 5 | 1.9 | 170 | do. |
| 7 | | 15 | 30 | 38.8 | 15 | 1.2 | 210 | do. |
| 8 | | 7.5 | 15 | 60 | 17 | 0.5 | 260 | do. |
| 9 | | 20 | 40 | 17.5 | 20 | 2.5 | 300 | do. |
| 10 | | 15 | 40 | 18.8 | 25 | 1.2 | 360 | do. |
| 11 | | 16 | 32 | 20.8 | 30 | 1.2 | 400 | do. |
| 12 | | 15 | 30 | 3.8 | 50 | 1.2 | 600 | do. |
| 13 | | 10 | 15 | 9.2 | 65 | 0.8 | 700 | do. |
| 14 | | 8 | 16 | 3 | 72.4 | 0.6 | 800 | do. |
| 15 | (by way of comparison) | 6 | 10 | 2 | 81.5 | 0.5 | ~800 | Cracked |
| 16 | do. | 8 | 10 | 3 | 78.4 | 0.6 | ~700 | do. |

\* determined as described in "Silicates Industriels", September 1958, pp. 443–446.
\*\* this product has a relatively low resistance to corrosion by sodalime glass at 1580°C, but may be advantageously used in the construction of parts of the furnace subjected to lower temperatures (of the order of 1250°C, for instance), since at such low temperatures it has a better resistance than the $Al_2O_3$-$ZrO_2$-$SiO_2$ products currently used and, although inferior to products with a very high alumina content, it may nevertheless be preferred to the latter for reasons of facility of manufacture (use of sand moulds instead of graphite moulds) and economy.